(12) United States Patent
Gupte et al.

(10) Patent No.: US 7,237,000 B2
(45) Date of Patent: Jun. 26, 2007

(54) SPEED OF EXECUTION OF A CONDITIONAL SUBTRACT INSTRUCTION AND INCREASING THE RANGE OF OPERANDS OVER WHICH THE INSTRUCTION WOULD BE PERFORMED CORRECTLY

(75) Inventors: Ajit Gupte, Pune (IN); Subash Chandar Govindarajan, Coimbatore (IN); Alexander Tessarolo, Sydney (AU)

(73) Assignee: Texas Instruments Incorporated, Dallas, TX (US)

( * ) Notice: Subject to any disclaimer, the term of this patent is extended or adjusted under 35 U.S.C. 154(b) by 724 days.

(21) Appl. No.: 10/202,151

(22) Filed: Jul. 24, 2002

(65) Prior Publication Data

US 2003/0037088 A1 Feb. 20, 2003

Related U.S. Application Data

(60) Provisional application No. 60/312,375, filed on Aug. 16, 2001.

(51) Int. Cl.
*G06F 5/52* (2006.01)
(52) U.S. Cl. .................................................... 708/655
(58) Field of Classification Search ................. 708/655
See application file for complete search history.

(56) References Cited

U.S. PATENT DOCUMENTS

| 5,016,210 A | * | 5/1991 | Sprague et al. | ............. 708/655 |
| 5,517,439 A | * | 5/1996 | Suzuki et al. | ................ 708/655 |
| 5,596,519 A | | 1/1997 | Van Aken et al. | |
| 5,644,524 A | | 7/1997 | Van Aken et al. | |
| 6,047,305 A | * | 4/2000 | Yano | ........................... 708/655 |
| 6,173,305 B1 | | 1/2001 | Poland | |
| 6,546,409 B1 | * | 4/2003 | Wong | ......................... 708/655 |

OTHER PUBLICATIONS

Behrooz Parhami: Computer Arithmetic, 2000,Oxford University Press, NY Oxford, pp. 211-217.

DSP Controllers Reference Guide CPU and Instruction Set, Jun. 1999, Texas Instruments, pp. 4-1 to 4-11;7-5 to 7-11 & 7-173 to 7-184.

* cited by examiner

*Primary Examiner*—Chuong D. Ngo
(74) *Attorney, Agent, or Firm*—Robert D. Marshall, Jr.; W. James Brady; Frederick J. Telecky, Jr.

(57) ABSTRACT

A circuit which first shifts both a dividend and a divisor by an extra bit such that a 1-bit shift can be avoided after subtraction of the shifted values of dividend and the divisor, while performing a conditional subtraction instruction. The shifted divisor can conveniently replace the dividend as required for the instruction. The approach can be used to implement, among others, 2N-bit/N-bit (denoted 2N/N) division using an N-bit ALU, N/N division using N-bit ALU. The division can be implemented for all possible values of N without requiring substantially more complexity in the implementation.

7 Claims, 2 Drawing Sheets

SPEED OF EXECUTION OF A CONDITIONAL SUBTRACT INSTRUCTION AND INCREASING THE RANGE OF OPERANDS OVER WHICH THE INSTRUCTION WOULD BE PERFORMED CORRECTLY

RELATED APPLICATION(S)

The present application is related to and claims priority from the co-pending U.S. Provisional Patent Application Ser. No. 60/312,375, entitled, "Improving the Speed of Execution of a Conditional Subtract Instruction and Increasing the Range of Operands over Which the Instruction Would Be Performed Correctly", filed on Aug. 16, 2001, and is incorporated in its entirety herewith.

BACKGROUND OF THE INVENTION

1. Field of the Invention

The present invention relates to circuits used for performing arithmetic operations, and more specifically to a method and apparatus for performing a conditional subtract operation typically used in a division arithmetic operation.

2. Related Art

Conditional subtract instructions are often used to perform division operations. In one known environment, a conditional subtraction instruction is specified in the format (subcu ACC, mem), wherein subcu is a pneumonic specifying that it is a conditional subtraction instruction, ACC specifies an accumulator containing a first operand, and mem specifies a memory location containing a second operand. The instruction is defined to operate according to the following equations:

$$\text{aluout} = ACC - (\text{mem} << (M-1) \text{bits}) \quad \text{Equation (1)}$$

$$\text{If (aluout.ge.0) then } ACC = (\text{aluout} << 1) + 1 \quad \text{Equation (2)}$$

$$\text{else } ACC = ACC << 1 \quad \text{Equation (3)}$$

wherein aluout represents the output of arithmetic logic unit, '<<' indicates a shift operation by a number of bits specified on the right hand side, '.ge' represents the greater-than-or-equal-to logical operation, M represents the number of bits in the dividend, and mem represents a memory storing the divisor.

Thus, the operand at the memory location is left-shifted by (M−1) bits and the shifted value is subtracted from the value in the accumulator. If the result is greater than or equal to zero, accumulator is set to a value resulting from left shifting aluout by 1 position and adding a 1. Otherwise, the value in the accumulator is left-shifted by 1 position.

When a division operation is sought to be performed, the accumulator is initially loaded with the dividend and the divisor is provided at the memory location mem. The conditional instruction (Equations 1-3) is repeated several times to generate the remainder and the quotient in the accumulator. The instruction is repeated a number of times equal to the number of bits in the dividend. At the end of the iterations, the accumulator contains the quotient and the remainder.

For example, assuming a four-bit dividend of 7 (0111 in binary), a four-bit divisor of 5 (0101), and an eight bit (2×N, wherein N represents the number of bits of dividend) accumulator, the accumulator is initialized with 0000 0111 (7), and the memory (at location mem) is set to 0000 0101. The conditional subtraction instruction is then performed 4 times.

In the first iteration, 00101000 (operand at mem shifted by 3 positions, wherein) is subtracted from 0000 0111 (7). As a negative result is obtained, accumulator is left shifted by one position. A negative result would be obtained for two additional iterations. In the fourth iteration, 00101000 is subtracted from 00111000 (dividend shifted by three bit positions), and equation causing a value of 0010 0001 to be stored in the accumulator by virtue of Equation (3).

The most significant four bits represent the remainder and the remaining four bits represent the quotient. While the example illustrates the division of N bit dividend with a N bit divisor ("N/N division") using a 2N bit-width accumulator and ALU, the same approach can be used to implement divisions of longer length divisions as is well known in the relevant arts. For further details on implementing division operations using conditional subtraction instructions, the reader is referred to a document entitled, "TMS320F/C24× DSP Controllers Reference Guide: CPU and Instruction Set", Literature number: SPRU160C, dated: June 1999, available from Texas Instruments, Inc. (the assignee of the subject application), which is incorporated in its entirety herewith.

From the above, it may be appreciated that the conditional subtraction instruction is used many times during a division operation. Thus, to complete a division operation quickly, it is generally necessary to perform conditional subtraction instruction also quickly. Quickness (speed) may be of particular concern in areas such as digital signal processors which may be employed in real time applications. Accordingly, there is a general need to improve the speed with which a conditional subtraction instruction is executed.

SUMMARY OF THE INVENTION

A conditional subtraction instruction may be implemented according to the following logic:

$$\text{aluout} = (ACC << 1) - (\text{mem} << M\text{-bits}) \quad \text{Equation (4)}$$

$$\text{If (aluout.ge.0) then } ACC = \text{aluout} + 1 \quad \text{Equation (5)}$$

$$\text{else } ACC = ACC << 1 \quad \text{Equation (6)}$$

wherein, the symbols "<<", ".ge.", ACC, aluout, mem respectively represent "left shift operation", "greater than or equal to logical comparison operation", accumulator (initially storing a dividend), the output of an ALU (arithmetic logic unit) performing the subtraction operation, and a divisor. M is defined with reference to Equation 1 above.

As may be noted in comparison to Equations (1)-(3) in the background, the two operands of the subtraction operation of Equation (4) are shifted left one more time. As a result, a similar shift is avoided in comparison to Equation (2). The avoidance of the shift operation causes the overall time duration to perform a conditional subtraction instruction to be minimized. As described below several embodiments can be implemented using the logic while increasing the throughput performance.

In one embodiment implementing N-bit/N-bit division (denoted N/N division) with a 2N bit ALU, the division operation is started by loading an accumulator with the dividend. The divisor is shifted by M bits and the accumulator is shifted by one bit. The ALU subtracts the shifted divisor from the shifted accumulator value.

A control logic examines the output of the ALU to determine if the ALU output is greater than or equal to 0. If the output is greater than or equal to 0, a value of (ALU output +1) is stored in the accumulator. If the output is negative, the value in the first shifter is stored in the accumulator. A multiplexor controlled by the control logic is used to select one of the two values for storing in the accumulator.

As a shift operation is not necessary after the ALU prior to storing in the accumulator and as the two shift operations prior to subtraction are performed in parallel, the total time duration required to perform a conditional subtraction instruction (and thus instructions such as division) is reduced.

In an embodiment implementing a N/N division using an N-bit ALU, an extra P-register is stored along with the accumulator. To start a division operation, the accumulator is initialized to zero and P-register is set to the dividend. Whenever a shift (in relation to dividend) is performed as in above description, the accumulator and P-register are shifted together (at least logically).

The embodiment can be extended to perform a 2N/N division also, but in two stages. In the first stage, the upper (most significant bit) N bits of the dividend are loaded into the P-register and the division is performed at the end. The accumulator contains the remainder and the P-register contains the upper bits of the quotient. The upper bits of the quotient are saved and the lower N bits of the dividend are loaded into the P-register and the division is performed in the second stage.

According to another aspect of the invention, the most significant bit of the accumulator is examined prior to each subtraction, and if the examined bit equals 1, the result of subtraction in the ALU is deemed to be positive. Such a feature accounts for the situation in which a 1 in the most significant bit of the accumulator may be 'lost' when left-shifted, and lead to an erroneous conclusion that the subtraction result is negative. By deeming the result as positive, the lost bit is accounted for. The implementation may merely require additional complexity to the control logic and may be preferred to alternative embodiments which may require that addition of a bit to the ALU. Due to such a feature, a 2N/N division can be performed for all possible values of N.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

DETAILED DESCRIPTION OF THE PREFERRED EMBODIMENTS

1. Overview and Discussion of the Invention

The present invention allows a conditional subtraction instruction to be executed quickly by first shifting the two operands using which a subtraction is to be performed. As a result, a shifter may not be needed after subtraction, thereby decreasing the processing time in the critical path of the performance of the conditional subtraction instruction. Due to the minimized processing time, division operations may be performed quickly.

The present invention can be appreciated by first understanding the delays present in a prior approach. Accordingly, a prior approach is described first.

2. Prior Approach

Figure 1:
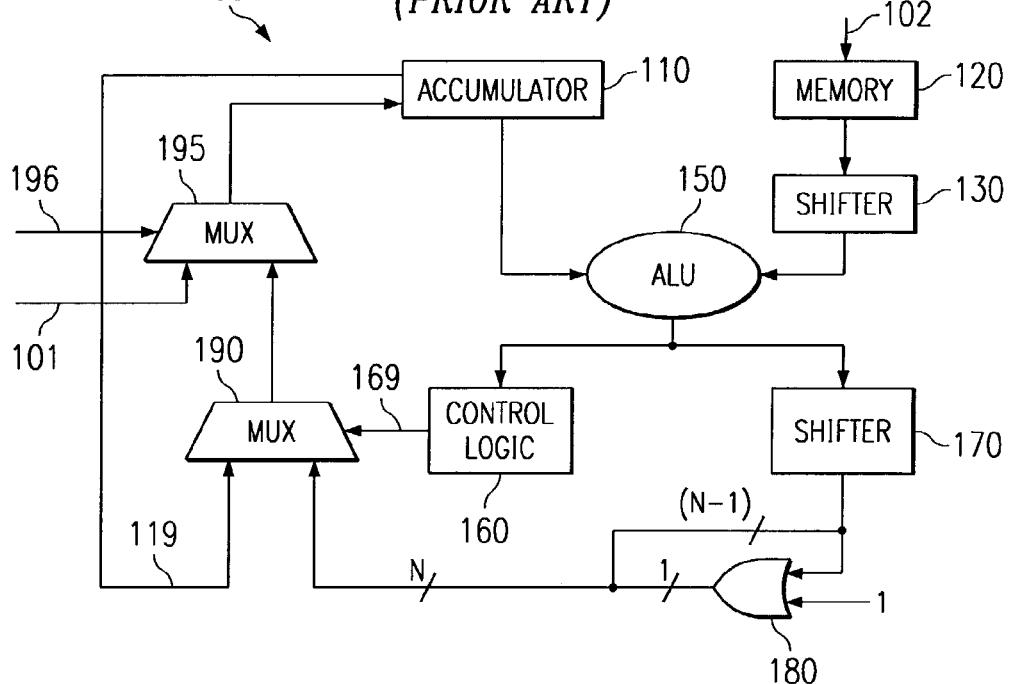
FIG. 1 is a block diagram illustrating a prior subtractor performing a conditional subtraction instruction.

FIG. 1 is a block diagram illustrating the details of subtractor 100 using a prior approach. Subtractor 100 is shown containing accumulator 110, memory 120, shifters 130 and 170, arithmetic logic unit (ALU) 150, control logic 160, OR gate 180 and multiplexors (MUX) 195 and 196. The components implement Equations 1-3 noted above in the background section as described in further detail below.

Accumulator 110 and memory 120 are respectively loaded with a dividend and a divisor using paths 101 and 102. Dividend on line 101 is loaded through multiplexor 195 by control of line 196. An external logic (not shown) controls line 196 to store in accumulator 110 either the dividend prior to (or at) the beginning of a division operation, or the output of multiplexor 190 while the conditional subtraction instruction is performed iteratively.

Shifter 130 left-shifts the divisor received from memory 120 by M positions. ALU 150 subtracts the shifted divisor from the value in the accumulator 110. Shifter 170 and OR gate 180 (with an input of 1) together implement Equation 2. Specifically, shifter 170 shifts the output of ALU 170 by one bit, and the least significant bit (LSB) output of shifter 170 is set to 1 by OR gate 180.

Control logic 160 implements the conditional logic (if and else portions) by causing accumulator 110 to be shifted left by one position if the output of ALU 150 is less than zero, or to store the output of shifter 170 and OR gate 180 (via multiplexor 190) otherwise. The left shift is implemented by causing multiplexor 190 to select bit 0-(N−2) (e.g., bit 0 through 30, when each operand is 32 bits wide) bits of the N-bit value in accumulator 110 concatenated with a 0 at the right to be stored back in accumulator 110.

As may be readily appreciated, subtractor 100 can be used to perform a conditional subtraction instruction (of Equations 1-3), and a division operation can be performed by iteratively using subtractor 100. Path 130, 150, 170, and 180 is the critical path in the implementation of conditional subtraction instruction of FIG. 1. Accordingly, it may be desirable to decrease the time delay along the path. The manner in which the delay can be reduced is described below.

3. Present Approach

Equations (4)-(6) of below can be used to implement the conditional subtraction instruction:

$$aluout = (ACC << 1) - (mem << M\text{-bits}) \quad \text{Equation (4)}$$

$$\text{If (aluout.ge.0) then } ACC = aluout+1 \quad \text{Equation (5)}$$

$$\text{else } ACC = ACC << 1 \quad \text{Equation (6)}$$

wherein, the symbols "<<", ".ge.", ACC, aluout respectively represent "left shift operation", "greater than or equal to logical comparison operation", accumulator and the output of an ALU performing the subtraction operation. M is defined with reference to Equation 1 above.

In comparison to Equation (1), both the operands to the subtraction operation of Equation (4) are shifted left by one more position before the subtraction operation, thereby keeping the relative bit positions for subtraction the same. As both operands are shifted by one more position, a shift operation is not needed in Equation (5) (whereas the shift operation is needed in Equation (2)). The IF condition in both Equations (2) and (5) yields the same result as may be readily appreciated based on the fact that both the operands used to generate ALUOUT have been shifted left by one position.

The reduction in delay in the critical path can be well appreciated by understanding a circuit implementation of Equations (4)-(6). The invention is described below with reference to an examples only for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention. Furthermore the invention can be implemented in other environments.

4. Circuit of Present Approach

Figure 2:
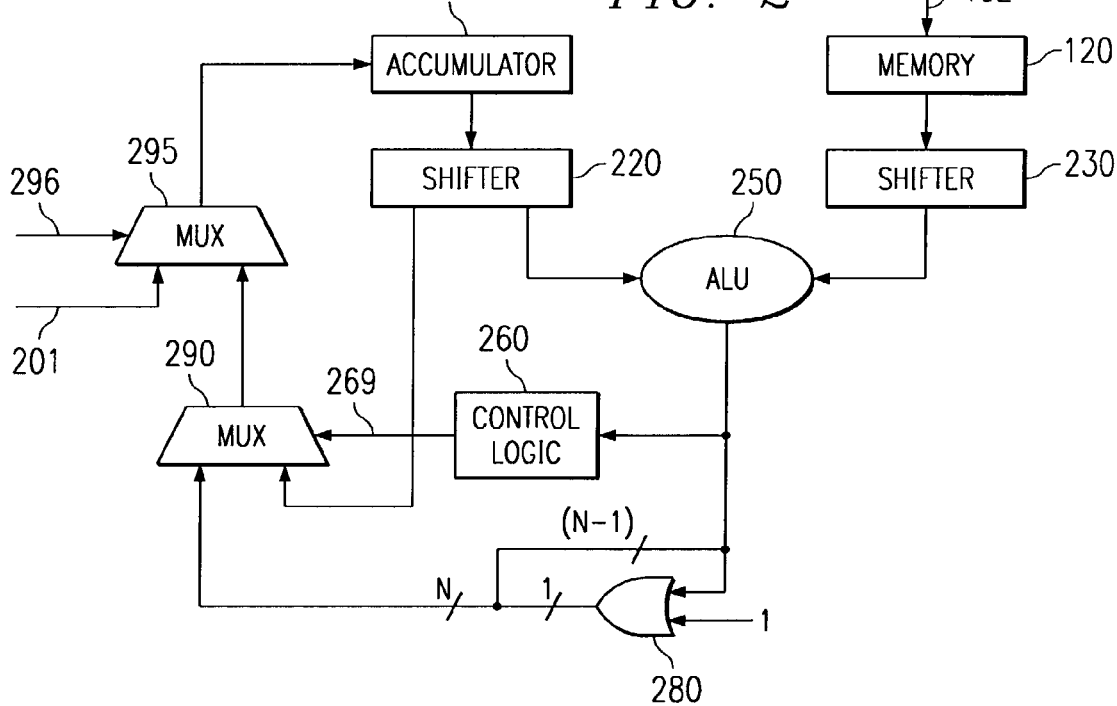
FIG. 2 is a block diagram illustrating an embodiment of subtractor performing a conditional subtraction instruction for N bit operands using a 2N bit arithmetic logic unit in accordance with the present invention.

FIG. 2 is a block diagram of an embodiment of a subtractor implemented in accordance with the present invention. Subtractor 200 is shown containing accumulator 210 (an example of a register), memory 120 (potentially operating similar as in FIG. 1), shifters 220 and 230, ALU 250, OR gate 280, control logic 260 and multiplexor 290. The manner in which the components implement Equations (4)-(6) is described below.

Accumulator 210 and memory 120 are respectively loaded with a dividend and a divisor using paths 201 and 102. An external logic (not shown) controls line 296 of multiplexor 295 to cause the dividend to be loaded prior to (or at) the beginning of the division operation. While the division operation is performed using the conditional subtraction instruction, the external logic causes the output of multiplexor 290 to be stored in accumulator 210.

Shifters 220,230 and ALU 250 together implement Equation (4). Specifically, shifter 220 left-shifts (i.e., shifts in the left direction) the value in accumulator 210 by one position, and shifter 230 left-shifts the value at address mem in memory 120 by M (i.e., equal to the number of bits in the dividend) positions. ALU 250 subtracts the shifted divisor from the shifted value in the accumulator.

OR gate 280 adds 1 to the output of ALU 150 by setting the least significant bit to 1. The input least significant bit would equal zero since both shifters 220 and 230 would have left shifted the respective operands by 1 position. Thus, the logical OR operation causes a 1 to be added. The one bit output of OR gate 280, and the remaining (N–1) bits together as provided to multiplexor 290.

Control logic 260 examines the output of ALU 250 to determine whether to store the output of ALU 250 incremented by 1 or shifter 220 into accumulator 210. Control line 269 is controlled accordingly to cause the determined operand/element to be stored in accumulator 210. Thus, using subtractor 200 one can implement conditional subtraction instruction which forms the basis for a division operation.

In comparison to FIG. 1, it should be noted that a shifter is eliminated after the performance of the subtraction operation in subtractor 200 of FIG. 2, but a new shifter is added prior to the operation of ALU 250. As the two shifters 220 and 230 operate in parallel, the total time duration for performing conditional subtraction instruction is reduced. As a result, subtractor 200 of FIG. 2 performs a conditional subtraction instruction in a shorter duration than subtractor 100 of FIG. 1.

The present approach described above can be used to perform divisions with different combination of bit lengths of dividends, divisors and ALUs. Some examples are described below in further detail.

5. N/N Division Using an ALU of 2N Bits

The approach described above can be used to implement division of a dividend of N bits by a divisor of N bits using ALU 250 which can operate on 2N bits. For example, a 16/16 division can be implemented using an ALU operating with 32 bit operands. That is, ACC 210, shifters 220 and 230, and ALU 250 all operate using 32 bit operands.

The 16-bit divisor is loaded into memory 120, the dividend into the lower half (least significant bits) of accumulator 210. The conditional subtraction instruction is performed 16 times by subtractor 200, and the quotient and remainder are obtained in accumulator 110 at the end.

6. N/N Division Using an ALU of N Bits

The present approach described above can be used to perform N (bits)/N (bits) division using a N-bit ALU. However, an additional N-bit register (referred to as a P register, shown FIG. 3 described in a section below) may also be required. The N/N division is described with reference to an example in which N=32. Equations (4)-(6) are modified as follows for the conditional subtraction instruction:

$$aluout = (ACC:P << 1) - mem \quad \text{Equation (7)}$$

if (aluout .ge. 0) {

$$ACC = aluout \quad \text{Equation (8)}$$

$$P = (P << 1) + 1 \quad \text{Equation (9)}$$

}
else {

$$ACC:P = ACC:P << 1 \quad \text{Equation (10)}$$

} wherein, the symbols "<<", ".ge.", ACC, aluout respectively represent "left shift operation", "greater than or equal to logical comparison operation", accumulator (310, shown below in FIG. 3) and the output of ALU (350). "ACC:P<<1" represents that the combination of accumulator and P-register are left-shifted by one position, at least in effect. An example implementation of Equations (7)-(9) is described with reference to FIG. 3.

Figure 3:
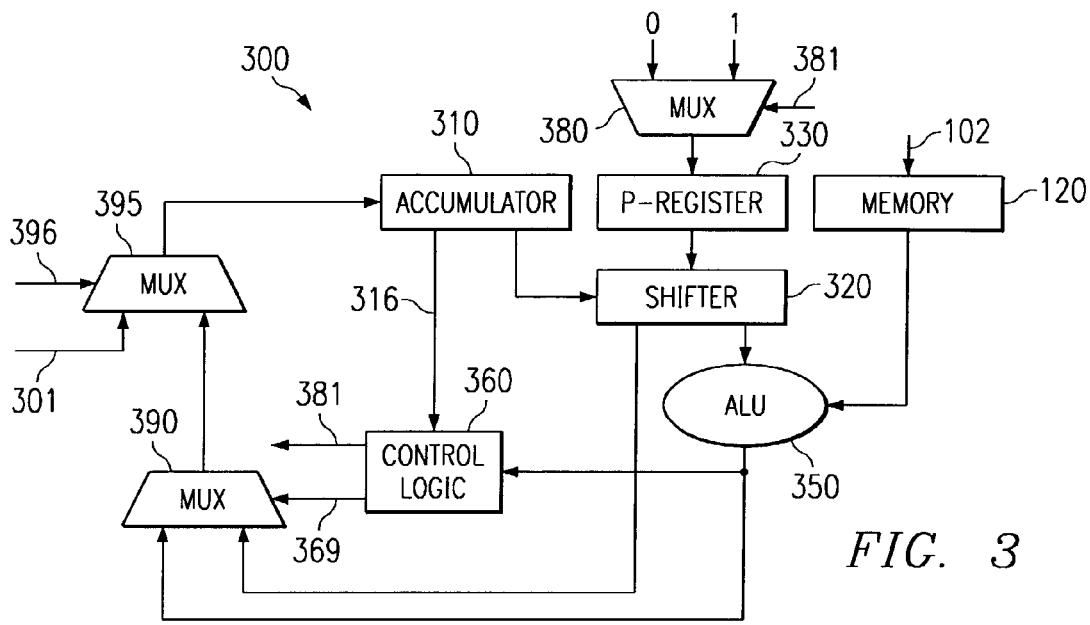
FIG. 3 is a block diagram illustrating an embodiment of subtractor performing a conditional subtraction instruction while supporting a division operation with 2N bit dividend and N bit divisor using a N bit arithmetic logic unit in accordance with the present invention.

FIG. 3 is a block diagram illustrating the details of subtractor 300 implementing Equations (7)-(9). Subtractor 300 is shown containing accumulator 310, shifter 320, P-register 330, memory 120, ALU 350, control logic 360, and multiplexors 380 and 390. The manner in which the components can be used to implement a conditional subtraction operation is described below.

Multiplexor 395 selects dividend provided on 301 at (or prior to) the beginning of a division operation. A control logic (not shown) controls control line 396 to cause either the data on line 301 or the output of multiplexor 390 to be selected. The selected value is stored in accumulator 310.

Multiplexor 390 selects either the output of ALU 350 or shifter 320 under the control of line 369. Control logic 360 controls line 369 to cause the output of ALU 350 to be selected when the IF condition of Equations (7)-(10) is true, and the output of shifter 320 otherwise. Multiplexor 380 selects either a 0 or 1 under the control of signal 381 generated by control logic 360. 0 is selected to implement Equation (10) and 1 is selected to implement Equation (9).

Accumulator 310 and P-register 330 are respectively loaded with 0 and dividend to start a division operation. Accumulator 310 is loaded with the output of multiplexor 390 as described above at the end of each iteration of the conditional subtraction instruction. P-register 330 is left shifted by one position at the end of each iteration. The bit carried-in into the least significant bit is generated by multiplexor 380 described above.

Shifter 320 provides ALU 350 and accumulator 310 (via multiplexor 390) data corresponding to "ACC:P<<1" of Equations 7 and 10. In one embodiment, (N−1) least significant bits of accumulator 310 and 1 most significant bit of P-register 330 are provided directly into shifter 320.

Memory 120 provides the divisor (denoted mem in the Equations). It may be noted that no shift operation need be performed on mem as the least significant bit position of mem is already aligned with the most significant bit position of shifted dividend in shifter 320. ALU 350 subtracts the divisor (provided by memory 120) from the shifted dividend provided by shifter 320.

In operation, the division operation is started by storing the dividend in P-register 330 and by initializing accumulator 310 to zero. Control logic 360 then operates the remaining components as described above to perform a conditional subtraction instruction defined by Equations (7)-(10). The conditional subtraction instruction is performed 32 times to obtain the quotient in P-register 330 and the remainder in accumulator 110.

Thus, a division operation can be implemented using subtractor 300 as described above. The operation of status signal 316 (between accumulator 310 and control logic 360) is not described above. The manner in which status signal 316 is used is described below with reference to 2N/N division using N-bit ALU.

7. 2N/N Division Using an ALU of N Bits

Subtractor 300 of FIG. 3 can be used to implement a 2N (bits)/N (bits) division with a N-bit ALU. The basic approach is described first, a problem without the use of status line 316 is noted next, and the manner in which status line 316 is used to accurately implement 2N/N division is described last.

The 2N/N division is performed in two stages using subtractor 300. In the first stage, the upper (most significant bits) N bits of the 2N-bit operand are stored in P-register 330 and accumulator is initialized to zero. The conditional subtraction instruction (according to Equations 7-10) is performed N times. At the end, the quotient and remainder of the upper division are obtained in P-register 330 and accumulator 310 respectively.

The quotient of the first stage represents the upper half of the quotient of the 2N/N division, and is stored in temporary storage space. In an embodiment, the temporary storage space is provided in a memory, and the quotient of the first stage is stored in the memory under the control of software.

In the second stage, the lower half (least significant bits) of the dividend is stored in the P-register. Accumulator 310 is kept unchanged. The conditional subtraction instruction is performed N times again. At the end, the lower half of the quotient is present in P-register 330. The value stored in temporary storage space at the end of stage one and the value at the end of second stage together represent the quotient of the 2N/N division. The entire remainder of the 2N/N division is obtained in accumulator 310.

One problem with the 2N/N division approach of above is that an erroneous result could occur for a range(s) of values of dividends/divisors. The problem is illustrated with reference to a simple example in which ALU, operands (dividend and divisor), accumulator 310 and P register 330, all of 4-bit width are used to perform a 8/4 division. For illustration, it is assumed that dividend=A0 and quotient=9, with the numbers being represented in the hexa-decimal system.

In the first stage of the division, the upper four bits (A) are loaded into P-register 330 (denoted as P below) and accumulator 310 (ACC) is set to zero. The conditional subtraction instruction is performed 4 times, and the results are noted below:

initially, ACC=0000, P=1010
iteration 1: 0001−1001; Result is −ve; therefore, ACC=0001, P=0100
iteration 2: 0010−1001; Result is −ve; hence, ACC=0010, P=1000
iteration 3: 0101−1001; Result is −ve; hence ACC=0101, P=0000
iteration 4: 1010−1001; Result is 0001, carry=1; hence +ve; hence ACC=0001, P=1.

Thus, for upper half division, quotient=1, remainder=1. The quotient (1) for the upper half is stored in a temporary register. The lower half (0) is loaded into the P-register. The results of 4 iterations of conditional subtraction instruction are shown below:
Initially: ACC=0001, P=0000
iteration 1: 0010−1001; Result is −ve; ACC=0010, P=0000
iteration 2: 0100−1001; Result is −ve; ACC=0100, P=0000
iteration 3: 1000−1001; Result is −ve, ACC=1000, P=0000
iteration 4: 0000−1001 =01 11; Result is −ve; ACC=0000, P=0000.

Thus, the result of the entire division of above is a remainder of 0 and quotient of 10, as against correct values of quotient=11, remainder=7.

A close observation of the above example would reveal that the reason for the error is the fact that a '1' was shifted out in the fourth iteration. Thus, in one embodiment, shifter 320 and ALU 350 are implemented to operate with (N+1) bits. However, the additional circuit complexity may be undesirable. Accordingly, an alternative embodiment uses status line 316 to perform the second stage of the 2N/N division accurately as described below in further detail.

8. Performing 2N/N Division Accurately

According to an aspect of the present invention, control logic 360 deems the result to be positive when the most significant bit of accumulator 310 is 1. Thus, the most significant bit is provided on status line 316, and control logic deems the result to be positive if either status line 316 indicates a 1 or if the result of subtraction is actually determined to be positive. An OR gate (not shown), which performs a logical OR operation of the value on status line 316 and the result of the subtraction may be employed. When the output of OR gate equals 1, the result is deemed to be positive. The resulting equations for conditional subtraction instruction are shown below:

$$aluout=(ACC:P<<1)-mem \qquad \text{Equation (11)}$$

if ((aluout .ge. 0) OR (ACC (MSB)==1)) {

$$ACC=aluout \qquad \text{Equation (12)}$$

$$P=(P<<1)+1 \qquad \text{Equation (13)}$$

}
else {

$$ACC:P=ACC:P<<1 \qquad \text{Equation (14)}$$

}

Equations 11-14 differ from Equations 7-10 only in the if condition in that a logical true condition would be returned when the most significant bit (MSB) of the accumulator equals 1 also. Due to the change, at the end of iteration 4 in the illustrative example of the previous section, ACC would be set to 0111, and P-register is set to 1. Thus, the result according to Equations 11-14 is quotient=11 and remainder=7, which is accurate.

Thus, a conditional subtraction instruction and a (2N/N) division operation may be implemented using Equations 11-14. The instructions can be used in many environments. An example system in which the conditional subtraction instruction and division operation are implemented is described below.

9. Example System

Figure 4:
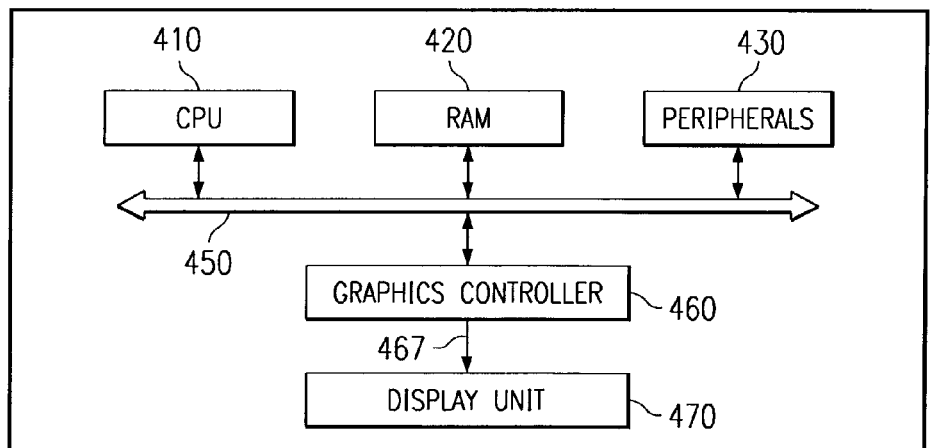
FIG. 4 is a block diagram of an embodiment computer system implemented in accordance with the present invention.

FIG. 4 is a block diagram of computer system 400 illustrating an example environment in which the present invention can be implemented. Computer system 400 includes central processing unit (CPU) 410, random access memory (RAM) 420, one or more peripherals 430, graphics controller 460, and display unit 470. Many components of computer system 400 communicate over bus 450, which can in reality include several physical buses connected by appropriate interfaces.

RAM 420 stores data representing commands and data (including operands for division operation). CPU 410 executes commands stored in RAM 420. Peripherals 430 can include storage components such as hard-drives or removable drives (e.g., floppy-drives). Peripherals 430 can be used to store commands and/or data which enable computer system 400 to operate in accordance with the present invention. Graphics controller 460 receives data/commands from CPU 410, and causes images to be displayed on display unit 470.

The conditional subtraction instructions described above can be implemented within CPU 410. CPU 410 represents a processor implemented in a computer system. However, processors in accordance with the present invention can be implemented in other environments as well. Examples of such environments include (but not limited to) digital signal processors. The details of an implementation of a processor are described below.

10. Processor

Figure 5:
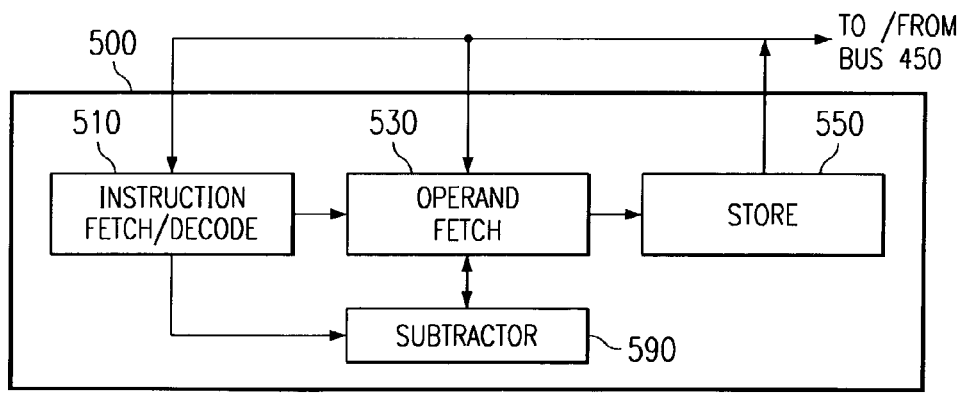
FIG. 5 is a block diagram of an embodiment of a processor implemented in accordance with the present invention.

FIG. 5 is a block diagram illustrating the details of processor 500 in one embodiment. Processor 500 is shown containing instruction fetch/decode 510, operand fetch 530, store 550 and subtractor 590. Processor 500 may correspond to CPU 410, and is described with reference to FIG. 4 for illustration. Each block of FIG. 5 is described below in further detail.

Instruction fetch/decode block 510 receives operation codes on bus 450, and decodes the instruction to determine whether an instruction Subtractor 590 implements the conditional subtraction instructions described above. Operand fetch block 530 provides the dividend and divisor to subtractor 590 to cause a division operation to be initiated. Subtractor 590 performs a division operation by using the conditional subtraction instruction(s) provided in accordance with the present invention. Store block 590 stores the result back in any location as specified by the instruction. Thus, the present invention enables efficient implementation of conditional subtraction instruction, can be used in various processors implementing operations such as division.

11. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A method for increasing data processing efficiency of an apparatus when performing a conditional subtract instruction of a first number and a second number, said method comprising:

loading said first number in a first register;

left-shifting said second number by M-bits to generate a shifted second number, wherein M represents a number of bits in said first number;

shifting said first number stored in said first register to the left by one bit to generate a shifted first number;

subtracting said shifted second number from said shifted first number via an arithmetic logic unit to generate a temporary value;

adding a 1 to said temporary value;

determining if said temporary value is greater than or equal to zero;

storing a result of adding 1 to said temporary value in said first register if said temporary value is greater than or equal to zero; and storing said shifted first number in said first register if said temporary value is less than zero, wherein said steps of loading, left-shifting, shifting, adding, determining, and storing cause the apparatus to more efficiently perform the conditional subtraction instruction.

2. The method of claim 1, wherein:

said first number and said second number respectively represent a dividend and a divisor of a division operation, and said left-shifting, said shifting said first register, said subtracting, said adding, said shifting, said determining and one of said storing steps are performed a plurality of times to perform said division operation.

3. The method of claim 2, wherein each of said divisor and said dividend comprises an N-bit number and said arithmetic logic unit (ALU) performing said subtracting operates using 2N bits, wherein N is a positive integer.

4. A circuit performing an instruction on a first number and a second number, said circuit comprising:

a first register receiving and storing said first number;

a first shifter having an input receiving said second number left-shifting said second number by M bits to generate a shifted second number at an output, wherein M represents a number of bits in said first number;

a second shifter having an input connected to said first register shifting said first number to the left by one bit to generate a shifted first number at an output;

an arithmetic logic unit (ALU) having a first input connected to said first shifter, a second input connected to said second shifter subtracting said shifted second number from said shifted first number to generate a temporary value at an output;

an add 1 circuit having a input connected to said output of said arithmetic logic circuit adding 1 to said temporary value to generate a temporary value plus one at an output;

a multiplexer having a first input connected to said output of said add 1 circuit, a second input connected to said output of said second shifter, an output connected to said first register and a control input, said multiplexer coupling one of said first input and said second input to said output dependent upon a signal at said control input; and a control logic having an input connected to said output of said arithmetic logic unit and an output connected to said control input of said multiplexer generating a signal to cause said multiplexer to select said first input if said temporary value is greater than or equal to zero generating a signal to cause said multiplexer to select said second input if said temporary value is less than zero.

5. The circuit of claim 4, wherein said first number and said second number respectively represent a dividend and a divisor of a division operation, and shifting by said first shifter, shifting by said second shifter, subtracting by said ALU, and storing by said control logic are performed a plurality of times to perform said division operation.

6. The circuit of claim 5, wherein each of said divisor and said dividend comprises an N-bit number and said ALU performing said subtracting operates using 2N bits, wherein N is a positive integer.

7. The circuit of claim 6, wherein:

said add 1 circuit comprises an OR gate replacing a least significant bit of said temporary value with a 1 to generate an OR output comprising N-bits.

* * * * *